US012309029B2

United States Patent
Singal et al.

(10) Patent No.: US 12,309,029 B2
(45) Date of Patent: May 20, 2025

(54) ZEROTOUCH BORDER GATEWAY PROTOCOL (BGP) CONFIGURATION IN NON-VOLATILE MEMORY EXPRESS OVER-FABRICS (NVMe-oF) ENVIRONMENTS

(71) Applicant: DELL PRODUCTS L.P., Round Rock, TX (US)

(72) Inventors: Pawan Kumar Singal, Milpitas, CA (US); Erik Smith, Douglas, MA (US); Balaji Rajagopalan, Sunnyvale, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 381 days.

(21) Appl. No.: 17/750,257

(22) Filed: May 20, 2022

(65) Prior Publication Data
US 2023/0379218 A1    Nov. 23, 2023

(51) Int. Cl.
| H04L 41/08 | (2022.01) |
| H04L 41/0806 | (2022.01) |
| H04L 41/084 | (2022.01) |
| H04L 41/12 | (2022.01) |
| H04L 45/02 | (2022.01) |
| H04L 45/033 | (2022.01) |

(52) U.S. Cl.
CPC ...... *H04L 41/0886* (2013.01); *H04L 41/0806* (2013.01); *H04L 41/12* (2013.01); *H04L 45/02* (2013.01)

(58) Field of Classification Search
CPC . H04L 41/0886; H04L 41/0806; H04L 41/12; H04L 45/02; H04L 41/0846; H04L 45/033; H04L 45/04
See application file for complete search history.

(56) References Cited

U.S. PATENT DOCUMENTS

| 8,422,514 | B1 * | 4/2013 | Kothari | H04L 12/4633 |
| | | | | 370/467 |
| 11,895,006 | B2 * | 2/2024 | Liu | H04L 45/033 |
| 2020/0169512 | A1 * | 5/2020 | Patel | H04L 47/527 |
| 2021/0075716 | A1 * | 3/2021 | Hsu | H04L 45/22 |
| 2023/0344747 | A1 * | 10/2023 | Li | H04L 43/0811 |
| 2024/0235994 | A1 * | 7/2024 | He | H04L 45/566 |

* cited by examiner

*Primary Examiner* — Harry H Kim
(74) *Attorney, Agent, or Firm* — BAUGH LAW, LLC (57) ABSTRACT

Border gateway protocol (BGP) configuration systems and methods automatically establish a BGP peering relationship between a BGP peer device and a centralized discovery controller (CDC) that allow the CDC to advertise routes to the BGP peer device. Various embodiments accomplish this by exchanging BGP information between the CDC, the BGP peer device, and a BGP auto-configuration service, which configures BGP parameters that establish the BGP peering relationship.

20 Claims, 7 Drawing Sheets

ZEROTOUCH BORDER GATEWAY PROTOCOL (BGP) CONFIGURATION IN NON-VOLATILE MEMORY EXPRESS OVER-FABRICS (NVMe-oF) ENVIRONMENTS

BACKGROUND

A. Technical Field

The present disclosure relates generally to information handling systems. More particularly, the present disclosure relates to systems and methods for BGP configuration in NVMe-oF™ environments.

B. Background

As the value and use of information continue to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In NVMe-oF™/Transmission Control Protocol (TCP) deployments when hosts and subsystems are only reachable via a Layer 3 (L3) IP network, each host and subsystem needs to insert route information to enable reachability. Today, such route insertion is performed by an administrator who manually configures the route table to ensure packets utilize the correct network interface. Alternatively, route insertion is automatically performed by software, e.g., nvme-stas, that inspects multicast Domain Name System (mDNS) packets and responses to a Get Log Page command, or support for the Border Gateway Protocol (BGP) can be enabled on end-devices e.g., FRR, Quagga, Bird, etc., to natively insert routes into the kernel. This mechanism provides a way to programmatically add route information based on network reachability and topology. However, the distribution of routes over BGP requires that first a BGP peer relationship be established, which involves statically configuring BGP peer information on NVMe® end-point devices on each side of a connection, e.g., by configuring router IP and router ASN information on remote devices. Since configurations are subject to frequent changes, having to continuously reconfigure BGP peer information impedes scaling in NVMe-oF™ environments.

Accordingly, it is highly desirable to find new, more efficient ways to configure BGP peering information in NVMe-oF™ and other environments and overcome the limitations of existing systems.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgment, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms, and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to a system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks, and the term "packet" shall not be interpreted as limiting embodiments of the present invention to L3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

In this document, the terms "discovery controller," "centralized discovery controller," and "discovery controller" may be used interchangeably. Similarly, the terms "auto-peering" and "auto-configuration" may be used interchangeably. End-device refers to any host, router, or subsystem that may serve as an end-point device.

Each reference/document mentioned herein is incorporated by reference herein in its entirety. It is noted that although embodiments described herein may be within the context of NVMe® deployments, aspects of the present disclosure are not so limited and may be applied or adapted for use in non-NVMe® systems, e.g., systems that can process BGP requests and may be used to establish BGP relationships.

Figure 1:
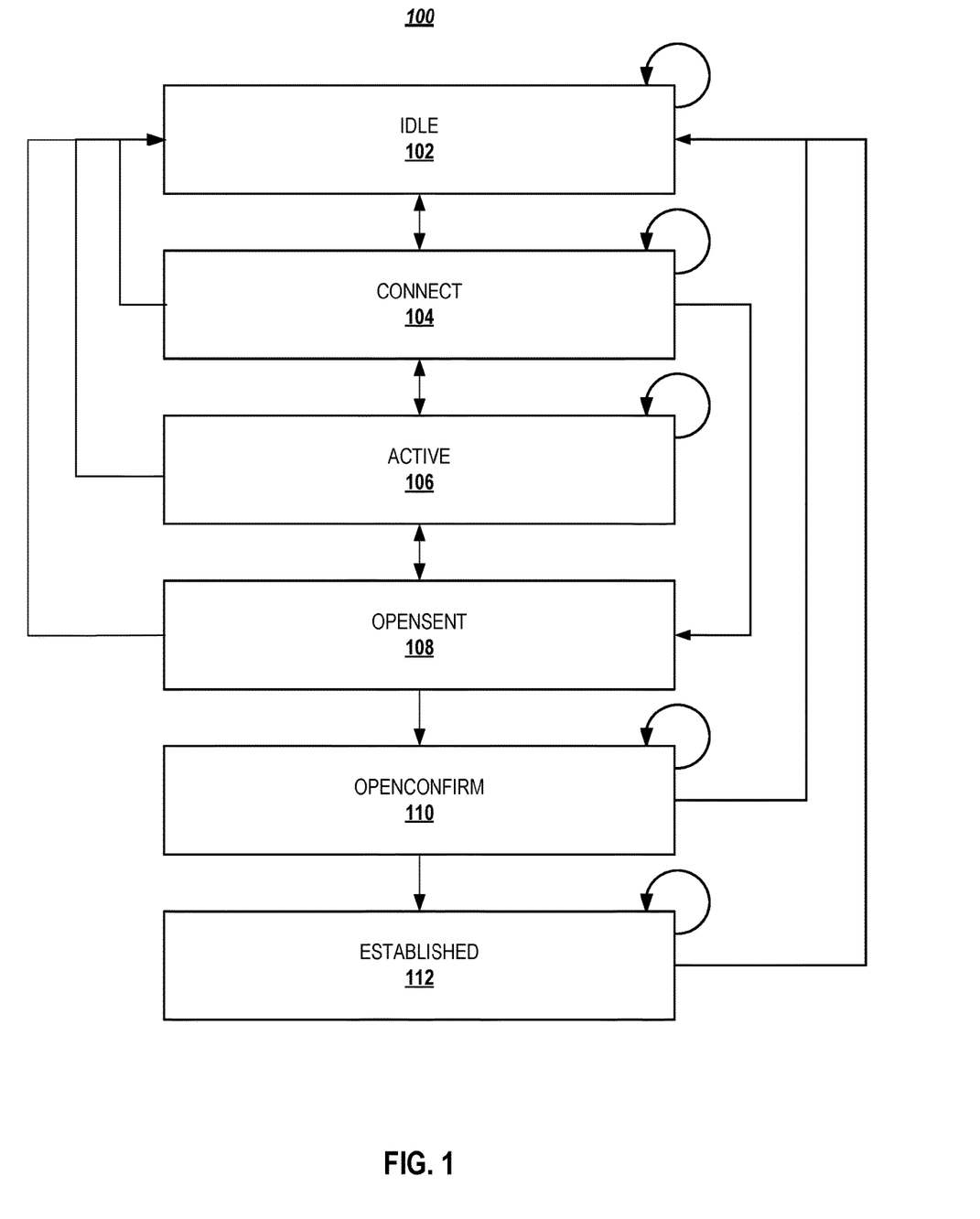
FIG. 1 ("FIG. 1") depicts a common finite state model and transitions for a basic BGP state machine.

FIG. 1 depicts a common finite state model and transitions for a basic BGP state machine. Model 100 comprises six states that correspond to various states that a BGP device may undergo in a BGP session, e.g., to obtain BGP configuration parameters that may be used to exchange BGP routes with a BGP peer device. As depicted in model 100, (1) no action is performed at Idle state 102. (2) Once a user configures BGP peer information on a device, the state machine transitions from Idle state 102 to Connect state 104. At this state, the device opens the well-known TCP port 179 to listen to incoming TCP connections from a BGP peer device and communicates to the BGP peer device a TCP connection initiation message. (3) Once similar configuration steps have been undertaken on the BGP peer device, a TCP connection may be established, and the BGP state machine transitions to Active state 106. (4) At Active state 106, each BGP device may send a "BGP connect" message and, the state machine may transition to OpenSent state 108. The BGP connect message may include the details on local information (e.g., IP address, ASN) as well as peer information (e.g., IP address, ASN). (5) Once both sides have sent and received the BGP connection information, the state machine will transition to Established state 112 at which point devices may commence exchanging routes.

As discussed in detail below, various embodiments herein take advantage of mDNS communication to allow end-devices to automatically obtain service configuration information, e.g., from a new field in an mDNS record. Automating the configuration of end devices in this manner, advantageously, eliminates the need for administrators to manually perform the configuration steps indicated by numerals (2) and (3), above.

Figure 2:
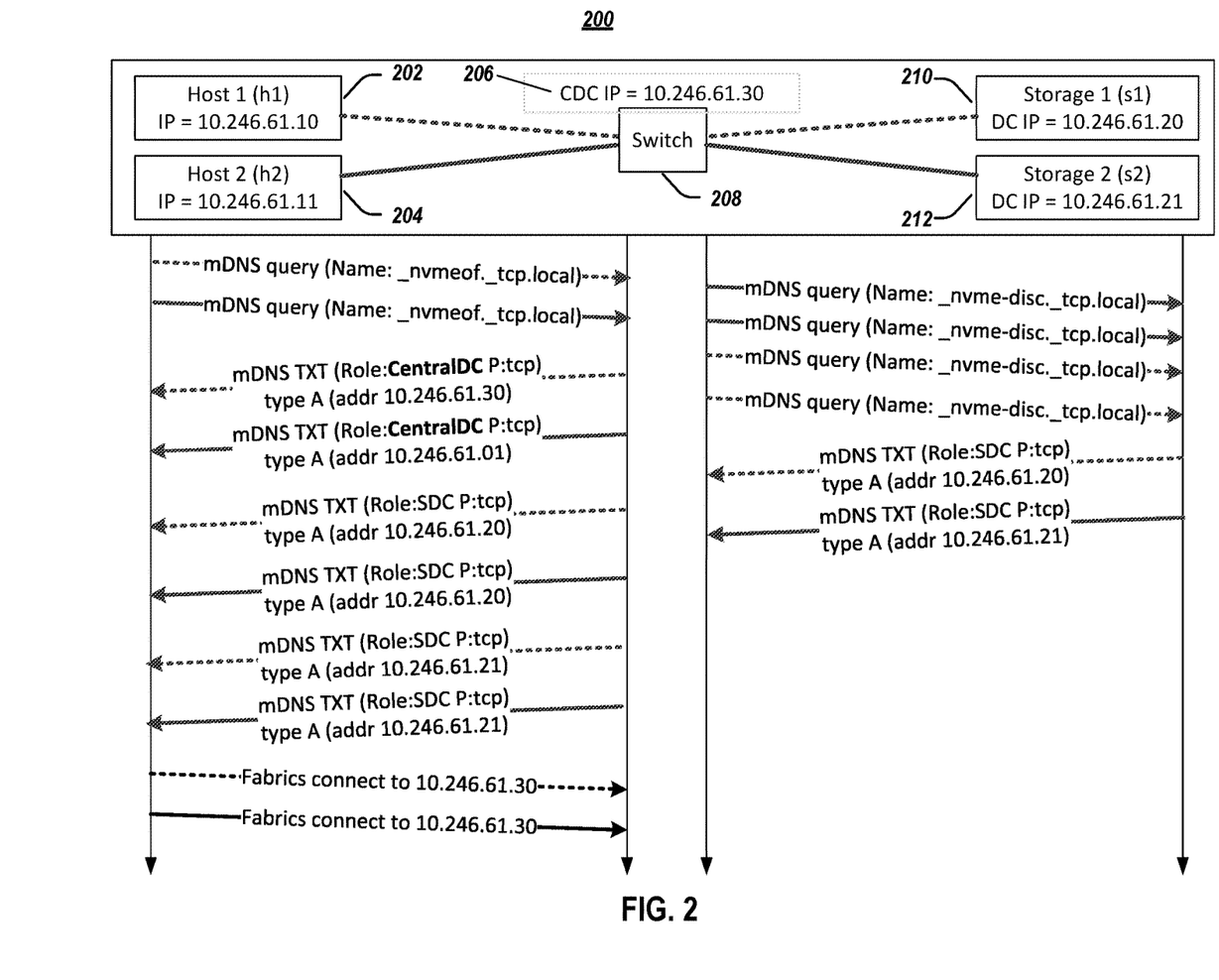
FIG. 2 depicts a diagram illustrating an existing NVMe-oF™ mDNS auto-discovery process.

FIG. 2 depicts a diagram illustrating an existing NVMe-oF™ mDNS auto-discovery method. FIG. 2 illustrates various message exchanges for automatic discovery of centralized discovery controllers (CDCs) via NVMe® end-points. As depicted, hosts 202, 204 and subsystems (storage 210 and 212) are communicatively coupled with CDC 206, which can be implemented as a virtual machine or be embedded in a fabric in a set of switches, such as switch 208. Generally, NVMe-oF™, which describes the manner in which NVMe® commands are transported over a Fibre Channel or IP-based network, provides support for auto-discovery of CDCs via technical proposal (TP) 8009. TP8009 describes how to use mDNS, which is a protocol that utilizes an mDNS communication to probe for, and discover, the presence of the _nvme-disc service in a broadcast domain in IP networks and to advertise the presence of such service.

In operation, CDC 206 communicates to hosts 202, 204 a "txt" record in an mDNS message that may contain information in a number of fields, such as a type field, a protocol field, and the like. If hosts 202, 204 and subsystems 210, 212 are within the same subnetwork as the CDC, they can discover the CDC via mDNS. For a host to reach a storage device (or vice versa) that is part of a different subnetwork (not shown), the host must identify next-hop information for each particular subnetwork. While BGP provides a means to add routing information, as mentioned in the Background section, distribution of routes over BGP requires that first a BGP peer relationship be established. This means that an administrator has to manually add appropriate routes to a host's IP routing table, e.g., each time a configuration change occurs. However, such static configuration of devices on each side of a connection is cumbersome and inefficient.

In practice, static configuration requires, at the least, the performance of steps including (1) on the NVMe® device, configuring the CDC details as a BGP peer device. This includes providing the IP address of the CDC and BGP autonomous system number (ASN) of the CDC, and (2) on the CDC side, for each device, configuring the BGP peer information, such as the IP address and ASN of the remote NVMe® device. The latter step in particular renders existing approaches suboptimal as they limit the number of NVMe® end-point devices to which routes can be distributed by using existing BGP methods. As a result, desirable scaling of configuration information to tens of thousands of devices becomes impractical. Therefore, what is needed are scalable systems and methods that can aid in automatically configuring BGP peering configuration on each side of a connection.

Various embodiments herein take advantage of the availability of BGP implemented on end devices and add routing information, such as BGP auto-discovery information (e.g., ASN), to an mDNS message as a descriptor, e.g., within an additional service record. For example, a CDC may communicate its ASN to an end device in a service record that comprises the CDC's ASN as a descriptor. In this manner, the mDNS protocol may be extended to not only allow for discovery and advertising of the presence of a service in a broadcast domain, e.g., an "auto-config BGP" service, but also to communicate to end-devices configuration information that enables an end-device to (1) configure itself to use that service (i.e., the remote ASN of the service) and (2) provide configuration information (i.e., the end-device's ASN) to the service to automatically establish a BGP peering relationship between the CDC and the end-device without the need for manual intervention.

It is understood that although BGP auto-discovery information is described herein within the context of being communicated in a service record that comprises a txt record of an mDNS message that may comprise a number of fields for a type, protocol, CDC IP address, CDC NVMe® qualified name (NQN), and the like, a person of skill in the art will appreciate that BGP information may be communicated in any format known in the art. For example, in one or more embodiments, a host may communicate BGP auto-discovery information to a CDC in an mDNS request for a BGP auto-peering service or BGP auto-configuration service to which the CDC may respond by providing the requested information in any suitable format.

Figure 3:
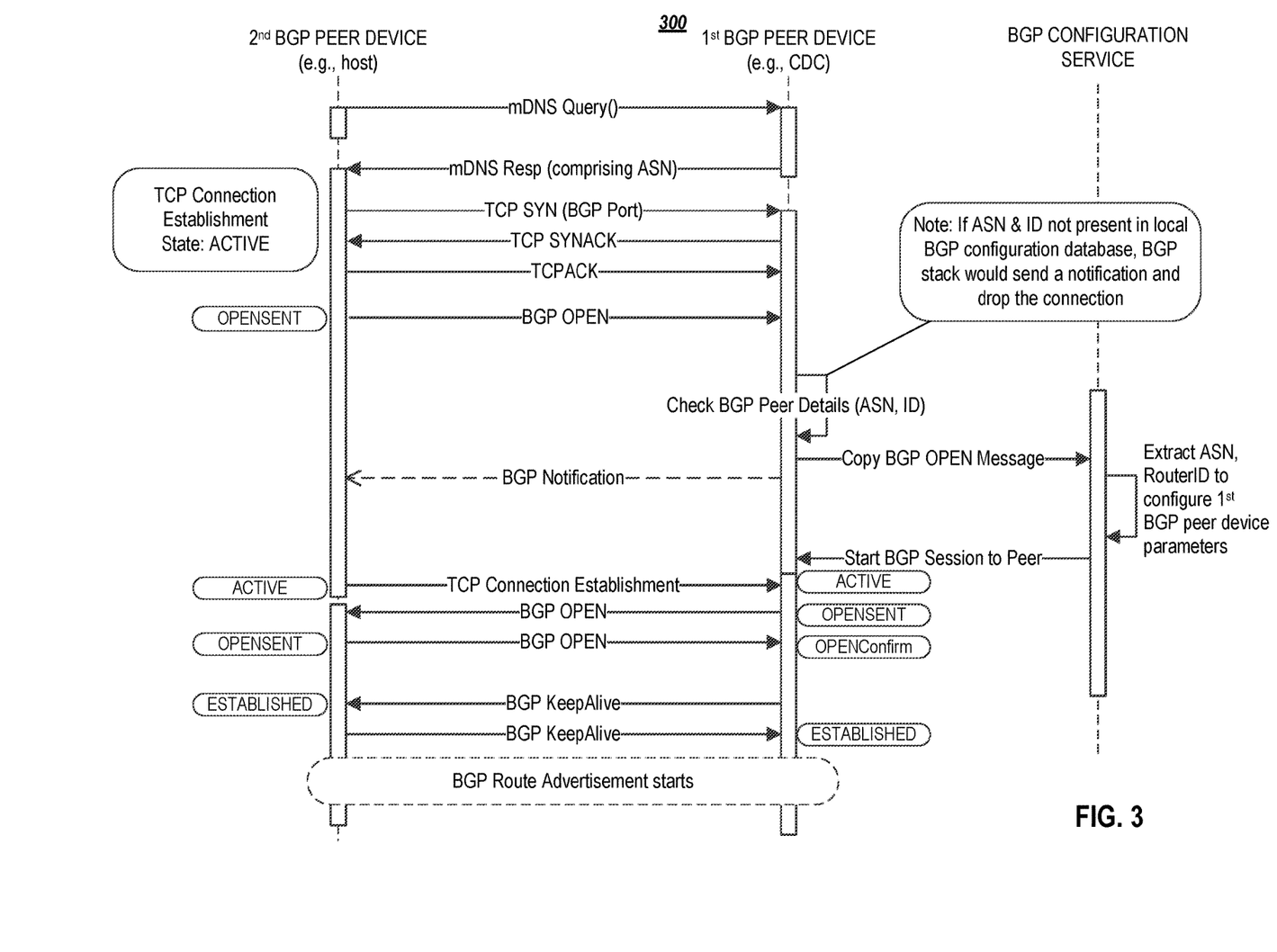
FIG. 3 depicts an exemplary sequence diagram for an NVMe® mDNS auto-configuration process using BGP, according to embodiments of the present disclosure.

FIG. 3 depicts an exemplary sequence diagram for an NVMe® mDNS auto-discovery process using BGP, according to embodiments of the present disclosure. In one or more embodiments, auto-discovery process may start when a BGP peer device, such as a remote NVMe® host, a storage subsystem, or any other network device that operates a BGP application, communicates an mDNS query to another BGP peer device (here, a CDC). As depicted in sequence diagram 300, the CDC, in response to receiving an mDNS packet from the host, may respond to the query with an mDNS message that may comprise the ASN of the CDC.

It is noted that sequence diagram 300 comprises any number of steps and intermediate steps that may correspond to any number of state transitions of a state machine according to the standard BGP protocol mentioned with reference to FIG. 1. For example, the handshake process depicted in FIG. 3 may comprise opening a TCP port and sending a TCP connect request to establish a TCP connection, which may cause the BGP state to transition to Active. In this state, the host may send a BGP Open message comprising BGP connect information (e.g., ASN and IP address), and the BGP state may transition to OpenSent.

It is further noted that in existing BGP procedures, BGP software would cause the CDC, in response to receiving the BGP Open message—and prior to a BGP peer session between the two peer devices having been established—to (1) drop or ignore that information, (2) send a BGP notification to the host, and (3) terminate the connection.

In contrast, a BGP state machine according to various embodiments herein may, instead of dropping information that has been received in a BGP Open message, copy such information (e.g., the ASN and IP address of the host) that is contained in the BGP Open message to a BGP auto-config service. In one or more embodiments, the BGP auto-config service, which may operate on the CDC, may extract that information to configure itself, e.g., in a new BGP session with the host. It is noted that, at this point, the host has already received the ASN of the CDC, e.g., via the previously mentioned mDNS message, or by any other means. As a result, a desired BGP peering relationship between the two BGP peer devices may be automatically established, i.e., without manual intervention by an administrator.

After a new TCP connection is established, the BGP state may transition to the Active state, and each device may send and receive BGP Open messages. At this point, the BGP state may transition from OpenSent to OpenConfirm to confirm that the BGP Open message has been received. Then, BGP KeepAlive messages may be exchanged, and the BGP state may transition to Established to indicate that the configuration of BGP session parameters is complete. Finally, the two peer devices may begin to advertise BGP routes to exchange routes.

Figure 4:
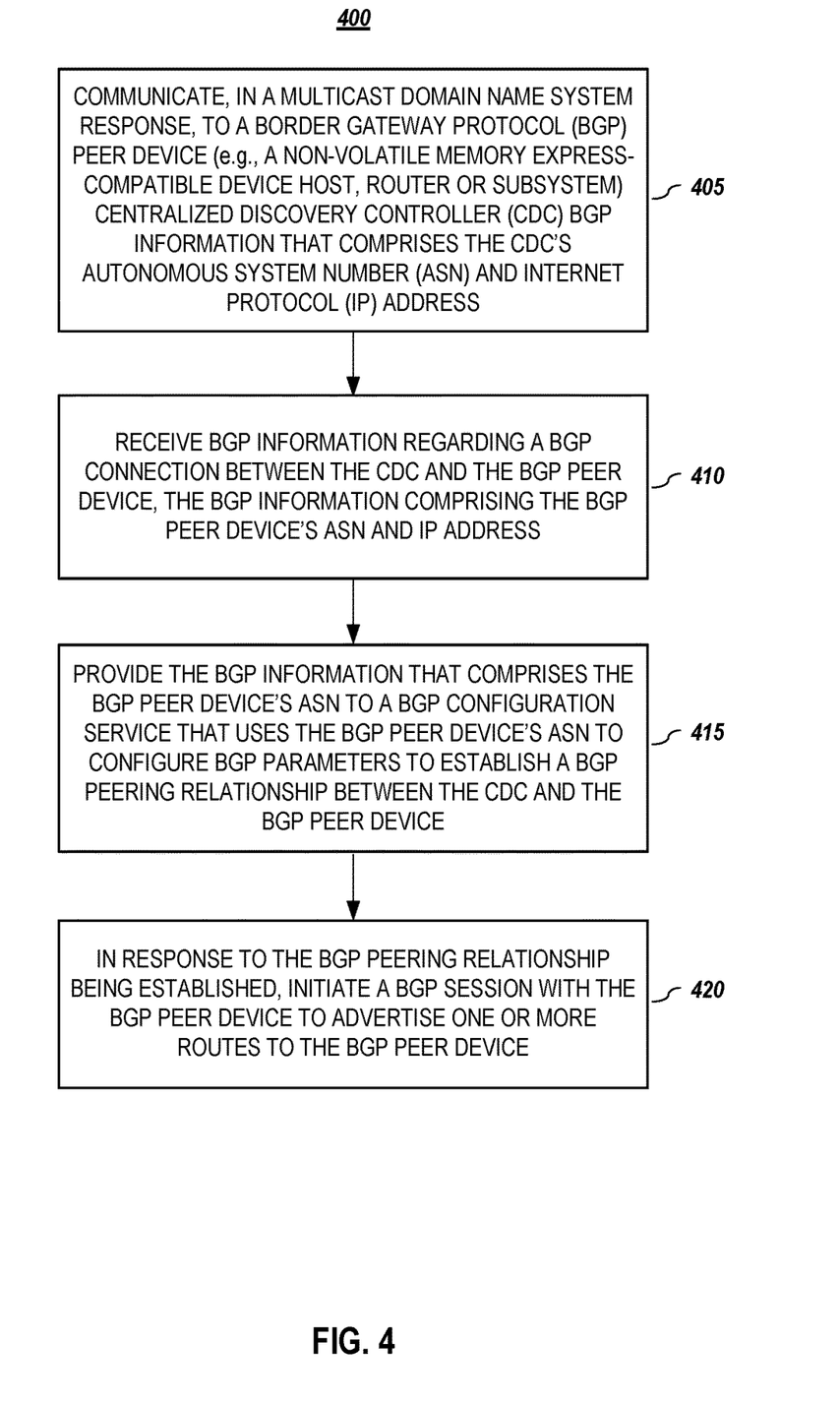
FIG. 4 depicts a flowchart illustrating an exemplary NVMe® mDNS auto-configuration process, according to embodiments of the present disclosure.

FIG. 4 depicts a flowchart illustrating an exemplary NVMe® mDNS auto-configuration process, according to embodiments of the present disclosure. In one or more embodiments, NVMe® mDNS auto-configuration process 400 may start when a CDC communicates (405) (e.g., in an mDNS response) to a BGP peer device (e.g., an NVMe-compatible host, router, or subsystem) CDC BGP information that may comprise the CDC's ASN and IP address. In one or more embodiments, auto-configuration process 400 may comprise the BGP peer device opening a TCP port and sending a TCP connect request to establish a TCP connection between the CDC and the BGP peer device, e.g., a connection according to the Connect state of the BGP state machine shown in FIG. 1.

Unlike in existing systems where, once the CDC, prior to the CDC being configured with the BGP peer's information, receives the BGP peer device's ASN and/or IP address, it will, per the standard BGP protocol for the BGP state machine, drop the connect message and terminate the connection. In contrast, in embodiments herein, the BGP state machine may instead of just dropping the BGP peer device's information, retain it, e.g., by copying it to a BGP auto-config service. Therefore, in one or more embodiments, once the CDC receives (410) BGP information regarding a BGP connection between the CDC and the BGP peer device, which may comprise the BGP peer device's ASN and IP address, the CDC may extract or derive that information and provide (415) the information learned from the connect request to a BGP configuration service. The BGP configuration service may store some or all of the received BGP information and use it to configure BGP parameters to establish a BGP peering relationship between the CDC and the BGP peer device.

Finally, once the BGP peering relationship has been established, the CDC may initiate (420) a BGP session to start a connect process with the BGP peer device to commence advertising one or more routes to the BGP peer device.

Figure 5:
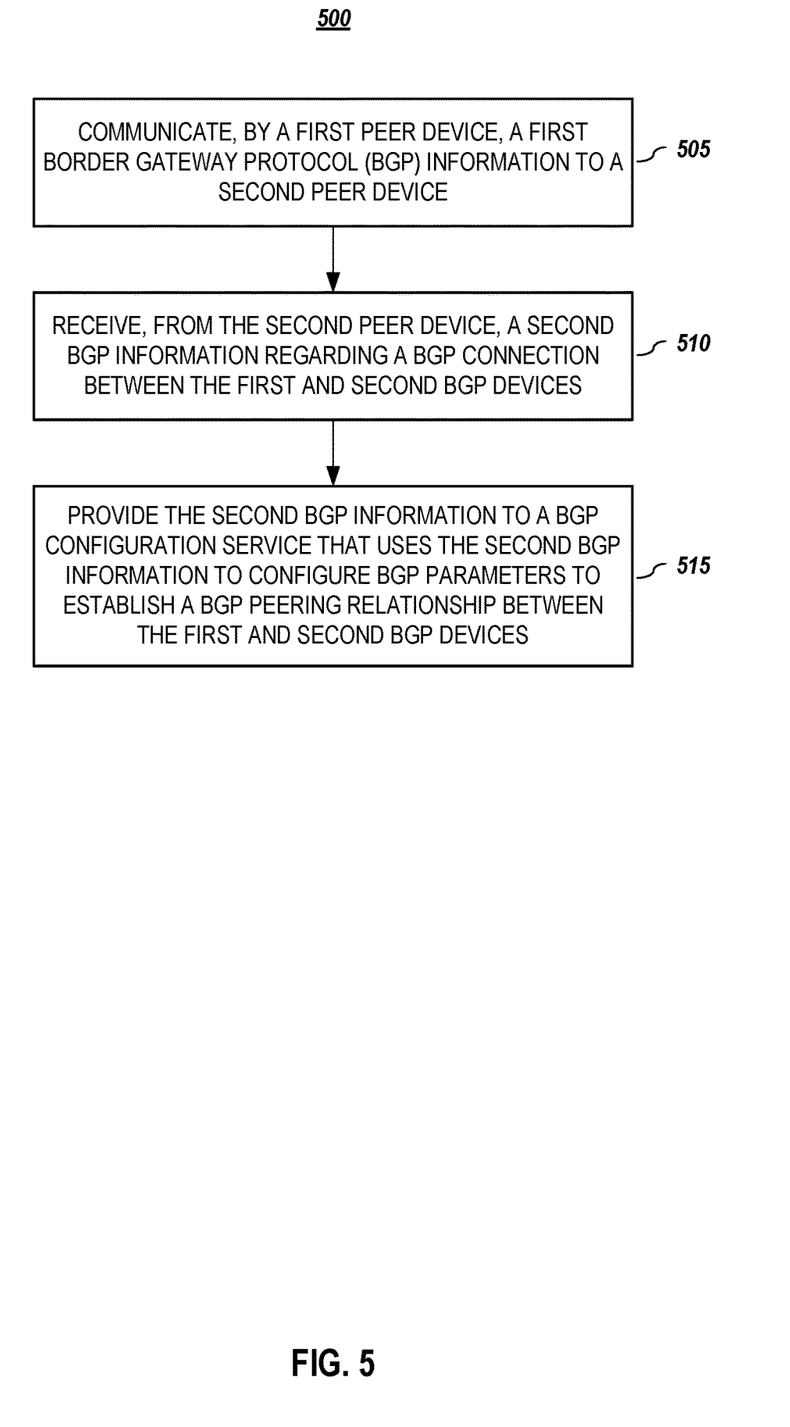
FIG. 5 depicts a simplified flowchart illustrating an exemplary auto-configuration process, according to embodiments of the present disclosure.

FIG. 5 depicts a simplified flowchart illustrating an exemplary auto-configuration process, according to embodiments of the present disclosure. In one or more embodiments, auto-configuration process 500 may start when a first peer device communicates (505) a first BGP information to a second peer device.

The first peer device may receive (510), from the second peer device, a second BGP information regarding a BGP connection between the first and second BGP devices. The first peer device may then provide (515) the second BGP information to a BGP configuration service that uses the second BGP information to configure BGP parameters to establish a BGP peering relationship between the first and second BGP devices.

Once the BGP connection is established, the first peer device may advertise or announce routes to the second peer device that would allow the second peer device to connect to other devices, such as storage subsystems. Advantageously, this enables the second peer device to automatically communicate with storage subsystems over a routed L3 network without the need for any manual or static configuration on both devices that form the BGP peer relationship.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); and (5) an acceptable outcome has been reached.

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smartphone, phablet, tablet, etc.), smartwatch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read-only memory (ROM), and/or other types of memory. Additional components of the computing system may include one or more drives (e.g., hard disk drives, solid-state drive, or both), one or more network ports for communicating with external devices as well as various input and output (I/O) devices, such as a keyboard, mouse, stylus, touchscreen, and/or video display. The computing system may also include one or more buses operable to transmit communications between the various hardware components.

Figure 6:
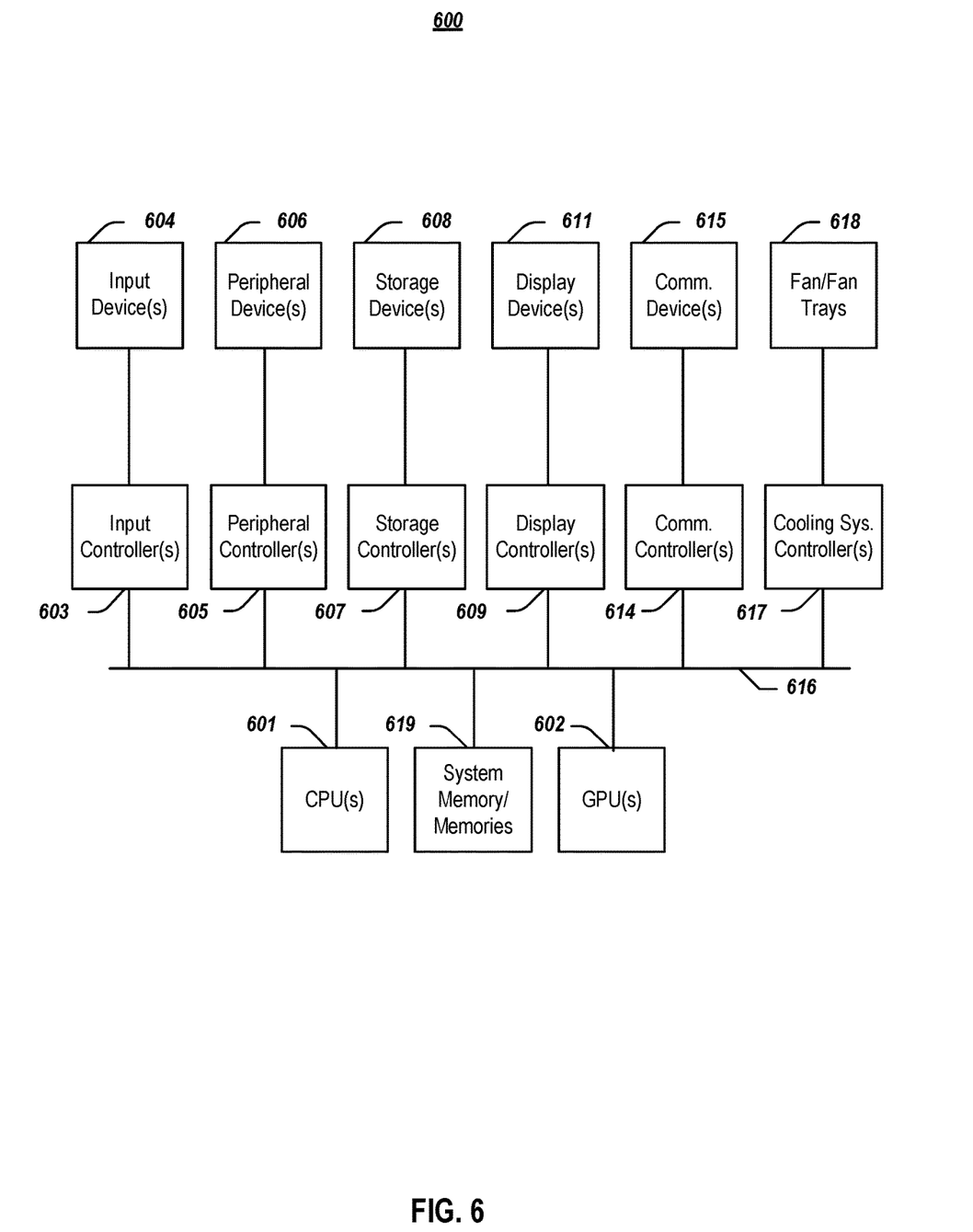
FIG. 6 depicts a simplified block diagram of an information handling system, according to embodiments of the present disclosure.

FIG. 6 depicts a simplified block diagram of an information handling system (or computing system), according to embodiments of the present disclosure. It will be understood that the functionalities shown for system 600 may operate to support various embodiments of a computing system—although it shall be understood that a computing system may be differently configured and include different components, including having fewer or more components as depicted in FIG. 6.

As illustrated in FIG. 6, the computing system 600 includes one or more central processing units (CPU) 601 that provide computing resources and control the computer. CPU 601 may be implemented with a microprocessor or the like and may also include one or more graphics processing units (GPU) 602 and/or a floating-point coprocessor for mathematical computations. In one or more embodiments, one or more GPUs 602 may be incorporated within the display controller 609, such as part of a graphics card or cards. The system 600 may also include a system memory 619, which may comprise RAM, ROM, or both.

A number of controllers and peripheral devices may also be provided, as shown in FIG. 6. An input controller 603 represents an interface to various input device(s) 604, such as a keyboard, mouse, touchscreen, and/or stylus. The computing system 600 may also include a storage controller 607 for interfacing with one or more storage devices 608 each of which includes a storage medium such as magnetic tape or disk, or an optical medium that might be used to record programs of instructions for operating systems, utilities, and applications, which may include embodiments of programs that implement various aspects of the present disclosure. Storage device(s) 608 may also be used to store processed data or data to be processed in accordance with the disclosure. The system 600 may also include a display controller 609 for providing an interface to a display device 611, which may be a cathode ray tube (CRT) display, a thin film transistor (TFT) display, organic light-emitting diode, electroluminescent panel, plasma panel, or any other type of display. The computing system 600 may also include one or more peripheral controllers or interfaces 605 for one or more peripherals 606. Examples of peripherals may include one or more printers, scanners, input devices, output devices, sensors, and the like. A communications controller 614 may interface with one or more communication devices 615, which enables the system 600 to connect to remote devices through any of a variety of networks including the Internet, a cloud resource (e.g., an Ethernet cloud, a Fibre Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 600 comprises one or more fans or fan trays 618 and a cooling subsystem controller or controllers 617 that monitors thermal temperature(s) of the system 600 (or components thereof) and operates the fans/fan trays 618 to help regulate the temperature.

In the illustrated system, all major system components may connect to a bus 616, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 7:
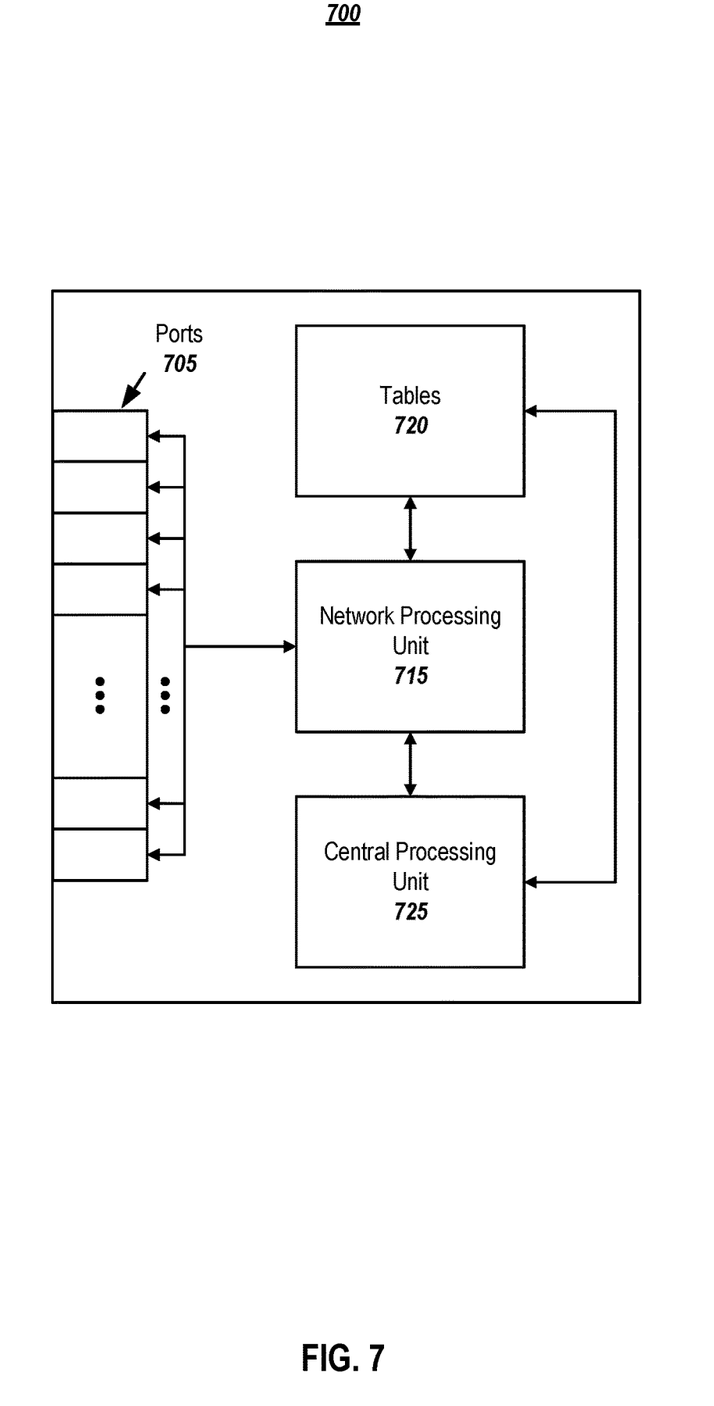
FIG. 7 depicts an alternative block diagram of an information handling system, according to embodiments of the present disclosure.

FIG. 7 depicts an alternative block diagram of an information handling system, according to embodiments of the present disclosure. It will be understood that the functionalities shown for system 700 may operate to support various embodiments of the present disclosure—although it shall be understood that such system may be differently configured and include different components, additional components, or fewer components.

The information handling system 700 may include a plurality of I/O ports 705, a network processing unit (NPU) 715, one or more tables 720, and a central processing unit (CPU) 725. The system includes a power supply (not shown) and may also include other components, which are not shown for sake of simplicity.

In one or more embodiments, the I/O ports 705 may be connected via one or more cables to one or more other network devices or clients. The network processing unit 715 may use information included in the network data received at the node 700, as well as information stored in the tables 720, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CDs and holographic devices; magneto-optical media; and hardware devices that are specially configured to store or to store and execute program code, such as ASICs, programmable logic devices (PLDs), flash memory devices, other non-volatile memory (NVM) devices (such as 3D XPoint-based devices), and ROM and RAM devices. Examples of computer code include machine code, such as produced by a compiler, and files containing higher-level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A processor-implemented border gateway protocol (BGP) configuration method, the method comprising:
    communicating, by a first peer device, a first BGP information to a second peer device;
    receiving, from the second peer device, a second BGP information regarding a BGP connection between the first and second peer devices; and
    providing the second BGP information to a BGP auto-configuration service that uses the second BGP information to configure one or more BGP parameters to establish a BGP peering relationship between the first and second peer devices.

2. The method according to claim 1 further comprising, in response to the BGP peering relationship being established, initiating a BGP session with the second peer device to communicate one or more routes to the second peer device.

3. The method according to claim 1 wherein the first peer device is a centralized discovery controller (CDC) and the second peer device is at least one of a host, a router, a switch, or a subsystem.

4. The method according to claim 3 wherein the BGP auto-configuration service is implemented on the CDC that stores at least one or more BGP parameters in a BGP configuration database.

5. The method according to claim 3 wherein the CDC communicates the first BGP information in a multicast Domain Name System (mDNS) response that is sent in response to an mDNS query by the host, the router, the switch, or the subsystem.

6. The method according to claim 1 wherein the first BGP information comprises an autonomous system number (ASN) of the first peer device and the second BGP information comprises an ASN of the second peer device.

7. The method according to claim 6 wherein the first BGP information further comprises an Internet Protocol (IP) address of the first peer device and the second BGP information comprises an IP address of the second peer device.

8. The method according to claim 1 wherein the BGP auto-configuration service is configured to listen to a request that comprises the second BGP information.

9. The method according to claim 1 wherein the second peer device is a non-volatile memory express (NVMe)-compatible device.

10. An information handling system for establishing a border gateway protocol (BGP) peering relationship, the system comprising:
    one or more processors; and
    a non-transitory computer-readable medium or media comprising one or more sets of instructions which, when executed by at least one of the one or more processors, causes steps to be performed comprising:
        communicating BGP information about the information handling system to a second device;
        receiving, from the second device, a second BGP information related to the second device, which is related to a connection between the information handling system and the second device; and providing the second BGP information to a BGP auto-configuration service that uses the second BGP information to configure one or more BGP parameters to establish a BGP peering relationship between the information handling system and the second device.

11. The information handling system of claim 10 wherein the BGP auto-configuration service operates on the information handling system.

12. The information handling system of claim 11 wherein the BGP auto-configuration service operating on the information handling system uses at least some of the second BGP information to configure one or more BGP parameters to establish a BGP peering relationship between the information handling system and the second device by performing steps comprising:

extracting from the second BGP information one or more BGP-related parameters to establish the BGP peering relationship between the information handling system and the second device.

13. The information handling system of claim 12 wherein the one or more BGP-related parameters extracted from the second BGP information comprises an autonomous system number (ASN) of the second device, an Internet Protocol (IP) address of the second device, or both.

14. The information handling system of claim 10 wherein the information handling system is further configured to perform steps comprising:

in response to the BGP peering relationship being established, initiating a BGP session with the second device to communicate one or more routes to the second device.

15. The information handling system according to claim 10 wherein the information handling system communicates its BGP information in a multicast Domain Name System (mDNS) communication.

16. A method for facilitating border gateway protocol (BGP) configuration, the method comprising:

communicating, by a first device, a first set of BGP-relevant information in a multicast Domain Name System (mDNS) communication to a second device;

receiving, from the second device, a second set of BGP-relevant information regarding the second device; and providing at least some of the second set of BGP-relevant information to a BGP auto-configuration service that uses information from at least some of the second set of BGP-relevant information to configure one or more BGP parameters to establish a BGP peering relationship between the first and second devices.

17. The method of claim 16 further comprising, in response to the BGP peering relationship being established, initiating a BGP session with the second device to communicate one or more routes to the second device.

18. The method of claim 16 wherein the BGP auto-configuration service operates on the first device, which stores at least one of the one or more BGP parameters in a BGP configuration database.

19. The method of claim 16 wherein the BGP auto-configuration service is further configured to listen to a request that comprises the at least some of the second set of BGP-relevant information.

20. The method of claim 16 wherein the second set of BGP-relevant information comprises an autonomous system number (ASN) of the second device, an Internet Protocol (IP) address of the second device, or both.

* * * * *